United States Patent [19]

Yurgevich

[11] Patent Number: 4,925,349
[45] Date of Patent: May 15, 1990

[54] ADAPTER CASTING AND INTERLOCK

[75] Inventor: Howard J. Yurgevich, Monticello, Ind.

[73] Assignee: Rosby Corporation, Monon, Ind.

[21] Appl. No.: 341,845

[22] Filed: Apr. 24, 1989

Related U.S. Application Data

[63] Continuation-in-part of Ser. No. 183,940, Apr. 20, 1988, Pat. No. 4,844,672.

[51] Int. Cl.$^5$ ............................................. B65D 90/12
[52] U.S. Cl. ........................................ 410/54; 410/77; 410/84; 410/44; 220/1.5
[58] Field of Search .................. 410/54, 84, 68, 71-76, 410/77-82, 70, 90, 44; 24/287; 220/1.5; 206/509, 511, 512

[56] References Cited

U.S. PATENT DOCUMENTS

| | | | |
|---|---|---|---|
| 2,975,933 | 3/1961 | Abolins | 220/69 |
| 3,085,707 | 4/1963 | Tantlinger | 220/1.5 |
| 3,646,609 | 2/1972 | Bodenheimer | 220/1.5 |
| 3,980,185 | 9/1976 | Cain | 214/10.5 R |
| 4,071,274 | 1/1978 | Dalton et al. | 296/35 A |
| 4,430,032 | 2/1984 | Morgan | 410/68 |
| 4,844,672 | 7/1989 | Yurgevich | 410/54 |

OTHER PUBLICATIONS

Copy of two commercial brochures of products by George Blair PLC: (a) "Piggi-Lok" Chassis Twistlock-Type BLR 624 (no date), (b) Stacklock with Integral Twistlock-Type BLR 1214 (no date).

Primary Examiner—Andres Kashnikow
Assistant Examiner—Mark T. Le
Attorney, Agent, or Firm—Barnes & Thornburg

[57] ABSTRACT

An adapter (50) is provided for adapting a wide-body container (10) including coupling members (20) to be supported upon a set of container supports (40) spaced at a pre-established standard width narrower than the width of the container. The adapter (50) includes a generally rectangular casting (52) having a plurality of apertures (54,56). A plurality of brackets (58,59,60) moveably mount the adapter (50) to a wide-body container coupling member (20) so as to permit deployment of the adapter below the container. When the adapter is not in use, the adapter is retained below the container adjacent to coupling member by a finger (88) engaging detent (86) on bracket (59). The finger (88) on the end of arm (90) can be released by removing retainer (98) and pulling on handle (102). A shaft (68) mounted to pivot within the adapter enclosure and a hook (80) fixed to the shaft for movement therewith is moved to a position engaging a container coupling member. The shaft (68) can be moved to a second position so the hook is disengaged from the container coupling member and situated generally within the adapter enclosure.

17 Claims, 2 Drawing Sheets

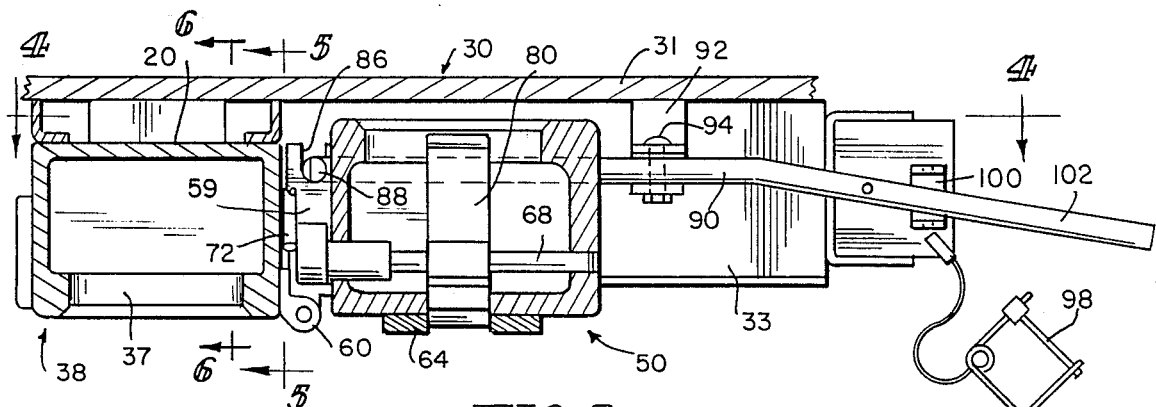
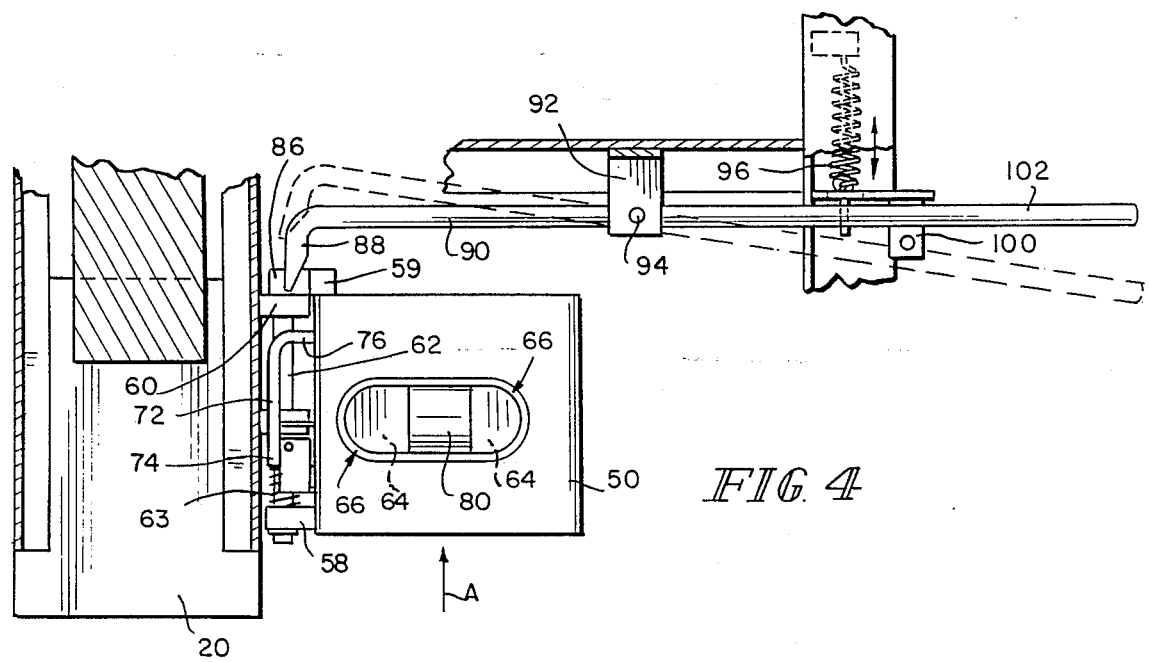
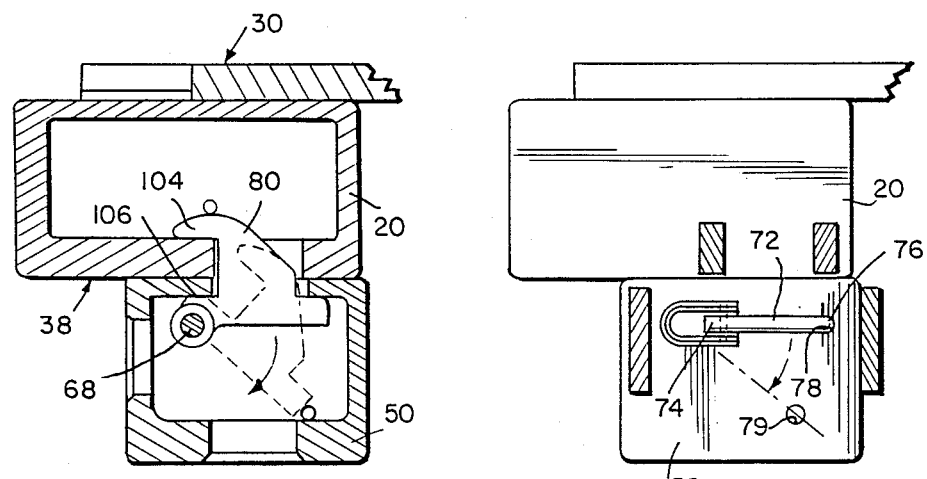

ADAPTER CASTING AND INTERLOCK

CROSS-REFERENCE TO RELATED APPLICATION

This is a continuation-in-part of application Ser. No. 07/183,940 filed Apr. 20, 1988, now U.S. Pat. No. 4,844,672, issued 7/14/89.

BACKGROUND OF THE INVENTION

This invention relates generally to containers for freight which are intended for use on various types of carriers including rail car, motor carrier trailer, and marine transport. Such freight containers have over the years acquired certain standard dimensions and structural features so as to permit the handling and stacking of such containers. This invention particularly relates to new wide-body shipping containers having an outside width approximately six inches greater than the previous standard container width and an adapter which will permit such wide-body shipping containers to be coupled to standard width container supporting devices on railroad cars and the like.

In the past, a large number of containers have been constructed generally in accordance with Tantlinger, U.S. Pat. No. 3,085,707 and Bodenheimer, U.S. Pat. No. 3,646,609. Such containers, through the standardization of the position of certain structural points, have achieved wide acceptance and can readily be used in conjunction with other similar containers regardless of overall container length. Containers of this general class have been standardized to have an outside width of ninety-six inches. This width dimension was adopted principally due to regulations on the maximum allowable width for highway truck-trailers. With this dimension so standardized, there has developed a relatively large body of existing truck-trailer chassis, railway flat cars, barges, and ships, having container supports which are specifically adapted for containers of ninety-six inches in width.

In recent years, various regulations concerning highway truck-trailers have been updated including regulations which now permit the use of trailers of even greater width dimension. The increase in width dimension of the trailer is directly translated to increased volume capacity for the trailer and hence is viewed as highly desirable by the industry. Freight containers also having the increased width are, for the same reasons, desirable but present a significant problem in that the support points of the containers are not situated at the previously standardized width. It is therefore necessary to adapt such wide-body shipping containers for engagement with standard-width container supports.

SUMMARY OF THE INVENTION

In accordance with the present invention, a wide-body shipping container is adapted for engagement with standard-width container supports by providing a plurality of adapters movably mounted with respect to supporting points on the bottom of the wide-body containers. Each adapter is movable to a position below the container supporting point and engageable therewith in such a manner as to define a new supporting structure spaced laterally inwardly from the outer most surface of the wide-body shipping container so as to permit coupling the container to a standard-width container support.

Generally, each adapter in accordance with the present invention comprises an enclosure, means pivotally mounting the enclosure to a wide-body container so as to permit deployment of the adapter below the container, means for lockingly engaging the enclosure below the container, and means for permitting the enclosure to be engaged by a container support.

In the preferred embodiment, the adapter of the present invention is a generally rectangular casting having a plurality of apertures. Mounting means is provided for moveably mounting the casting to a wide-body container so as to permit deployment of the adapter below the container coupling member at a position slightly inside the lateral outer most wall of the wide-body container. Locking means is provided for locking the enclosure below the container adjacent to a container coupling member when the adapter is not in use. Engagement means is provided for engaging the enclosure to the container coupling member when situated therebelow including a shaft mounted to pivot within the adapter enclosure and a hook fix to the shaft for movement between a first position engaging a container coupling member and a second position disengaged from the container coupling member and generally within the adapter enclosure.

In the preferred embodiment, the mounting means comprises a pivot-defining means fixed to the container coupling member, a plurality of brackets fixed to the enclosure, and pin means for engaging the brackets and pivot-defining means to establish an axis about which the adapter can pivot. The locking means comprises a detent situated on one of the brackets and an arm pivotally mounted to the container, the arm including a finger engagable with the detent to secure the enclosure at a position adjacent to the container coupling member. Means is provided for biasing the arm and finger into engagement with the detent, and retainer means is provided for retaining the arm and finger in engagement with the detent.

One feature of the present invention is a wide-body shipping container which is adapted for engagement with either standard width or wide-body width supports. Such a shipping container can be advantageously employed on highway truck-trailer chassis, railway flat cars, or the like which are specifically designed for standard-width containers.

Another feature of the present invention is an adapter for adapting a wide-body container so as to be supported upon a set of standard-width container supports. The adapter can advantageously be added to existing wide-body containers with only the minimum of modification. The capital cost of providing such adapters for wide-body containers is believed to be small as compared to the capital expenditure required for the total modification or replacement of all rolling stock used in the handling of such containers.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

BRIEF DESCRIPTION OF THE DRAWINGS

FIG. 3 is a sectional view taken along lines 3—3 of FIG. 1.

FIG. 4 is a sectional view taken along lines 4—4 of FIG. 3.

FIG. 5 is a side elevation view taken along lines 5—5 of FIG. 3. with the adapter casting positioned below the fixed casting.

FIG. 6 is a sectional view taken along lines 6—6 of FIG. 3. with the adapter casting positioned below the fixed casting.

DESCRIPTION OF THE PREFERRED EMBODIMENT

Figure 1:
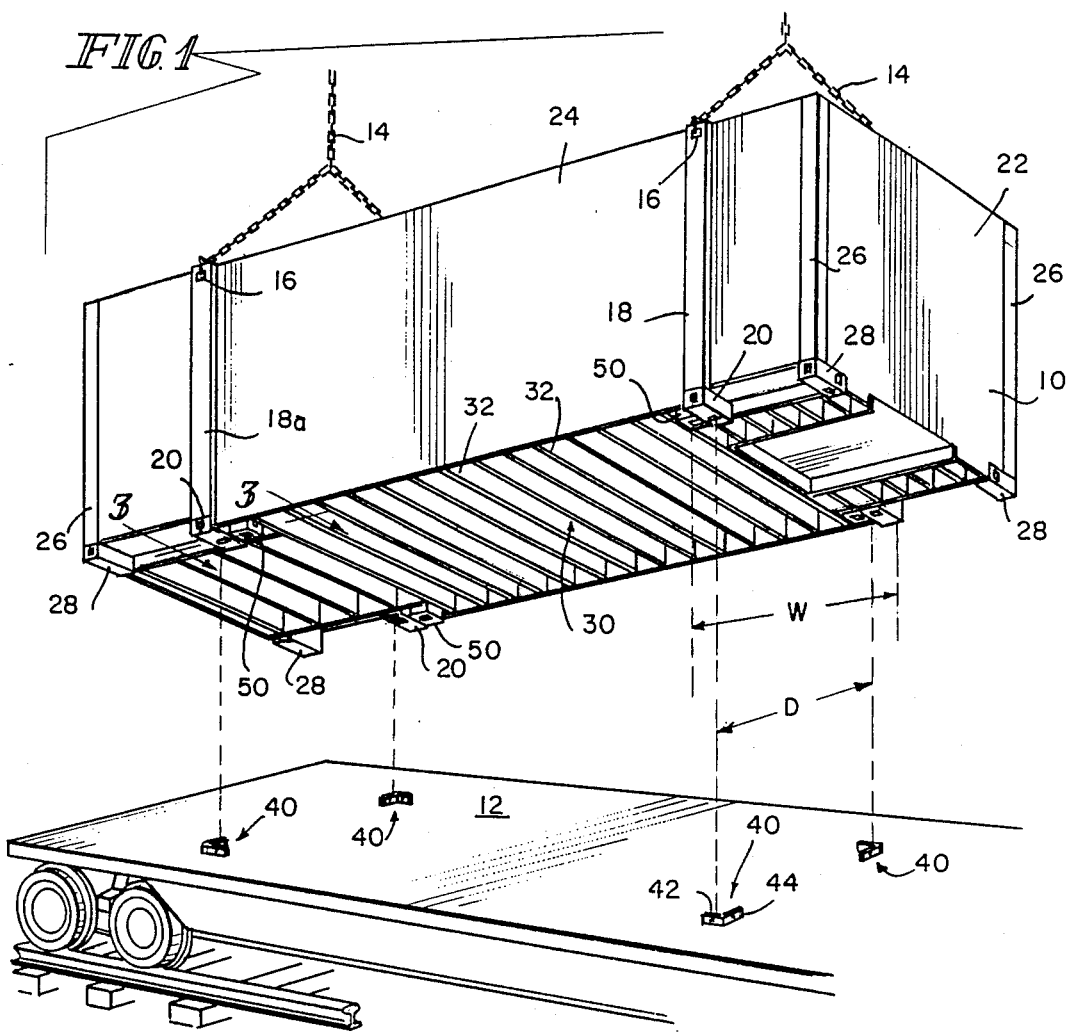
FIG. 1 is a perspective view showing a wide-body shipping container in accordance with the present invention adapted for engagement with standard-width container supports located on a rail-car.

A wide-body shipping container 10 is shown suspended above a railroad car 12 by means of chains 14 of a hoisting device (not shown). The chains 14 are shown to engage openings 16 in the upper ends of support posts 18. These support posts 18 of container 10 are disposed so as to form a uniformly spaced frame means intended to cooperate with other containers of the same or different length during shipment. The frame means also provides for convenient handling of the container as illustrated in FIG. 1. The outside surface of the support posts 18 are generally situated at the maximum allowable outside dimension W for the wide-body container. Coupling members 20 are provided at the lower end of support posts 18 for coupling the container 10 either to other frame means on other containers, or to container supports on rolling stock such as railroad car 12, highway truck-trailer chassis, barges, or ships (not illustrated).

The container 10 is seen to include end walls 22 and side walls 24 joined at the corner by corner posts 26. Coupling members 28 are provided at the lower end of corner post 26 which are similar to coupling members 20. The bottom surface of the coupling members 20 and 28 are generally coplanar. A floor 30 of the container is defined by a plurality of cross members 32 supporting a layer of wood or other material (not shown).

The railroad car 12 is shown to include four container supports 40. The container supports 40 are intended to ensure that the container 10 is maintained in a fixed position with respect to the car 12 when mounted thereon. While the container supports 40 may vary somewhat in design, they generally comprise a pair of upstanding walls 42 and 44 arranged at right angles to each other for capturing a corner of a shipping container coupling member 20 or similar structure. While in certain circumstances the container supports 40 are longitudinally moveable with respect to car 12, they are generally not moveable in the width dimension W and instead are positioned at a fixed dimension D. It will be appreciated that where the distance D between the outer walls 42 of container supports 40 is less than the outer dimension W of coupling members 20, it is not possible to situate the container 10 within the corners defined by the container supports 40 without providing some adaptive means.

In accordance with the present invention, four adapters 50 are provided to permit the wide-body container 10 to be coupled to the container supports 40 which are situated at the standard width D.

Figure 2:
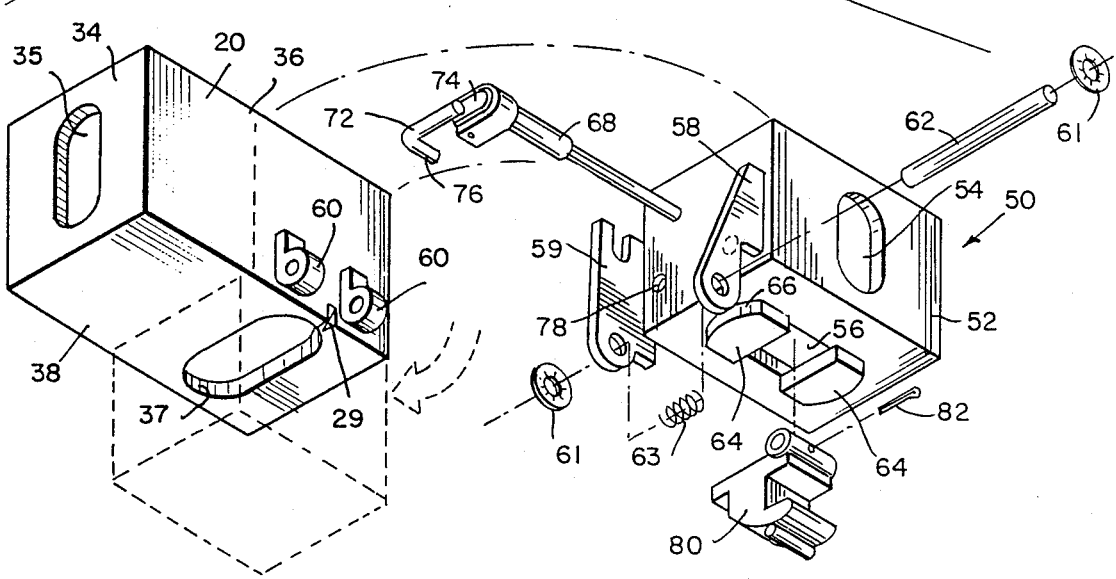
FIG. 2 is an exploded view of a coupling member of a wide-body shipping container and an adapter in accordance with the present invention.

FIG. 2 is an enlarged and exploded view of the coupling member 20 and adapter 50 at the bottom of support post 18a. The coupling member 20 includes a laterally outer side 34 forward or rearward side 36 and a lower surface 38. The coupling member 20 is generally a hollow cast steel member having apertures 35 and 37 for engaging various supporting and retaining structures in accordance with the general aims of containers of this class. Additional apertures can be provided in the casting as may be necessary to ensure for the cooperative connection between container 10 and the structures and facilities with which the containers are to be employed.

The adapter 50 is shown to comprise a generally rectangular casting 52 having apertures 54 and 56. The adapter 50 includes a plurality of projections or brackets 58 and 59 which together form a first pivot defining means. A second pivot defining means is provided by attachment lugs 60 which are welded to a wall 36 of coupling member 20. The attachment lugs 60 and brackets 58, 59 each include a hole for receiving hinge pin 62 which pivotally engages the adapter 50 to the coupling member 20. A spring 63 surrounds pin 62 and is situated between bracket 58 and one of the lugs 60. The spring 63 biases the adapter 50 as will be described later. Retainers 61 are fixed to the ends of pin 62 to retain the pin in coupling relation with the lugs 60 and brackets 58 and 59.

The adapter 50 further includes shoulders 64 fixed to the outer surface of the adapter 50 on either side of aperture 56. The shoulders 64 include an outer edge 66 shaped to conform to the surface of aperture 37 in the lower surface 38 of coupling member 20. The shoulders 64 act to ensure proper positioning of the adapter 50 with respect to the coupling member 20 when the adapter is pivoted to the position shown in phantom.

The adapter 50 also includes a shaft 68 mounted for pivotal movement in the adapter housing. A bracket 70 is fixed to the shaft 68 and a handle 72 is pivotally connected by a first end 74 to the bracket 70. A second end 76 of the handle 72 projects toward the adapter housing and is engagable into aperature 78. A spring (not shown) biases the second end 76 of the handle into engagement with the aperature 78. An engagement means in the form of a hook 80 is fixed to the shaft 68 by pin 82 for movement with the pivoting of shaft 68 through opening 56 between shoulders 64 into and out of engagement with the coupling member 20.

In the sectional view of FIG. 1 shown in FIG. 3, the floor 30 of the container 10 is shown to include a wooden layer 31 supported by member 33 which is fixed to cross members 32 shown in FIG. 1. It will be noted that the lower surface 38 of coupling member 20 is situated slightly below the lower most projection of member 33 so as to define a plane upon which the container 10 would ordinarily rest in the absence of the use of the adapters 50. The adapters are shown pivoted to a non-deployed position above the plane defined by the coupling member lower surface 38. The adapter 50 is held in this position by virtue of the locking means 84 shown in FIGS. 3 and 4.

The locking means 84 is shown to comprise a detent 86 on bracket 59 into which is received a finger 88 on one end of arm 90. The arm 90 is pivotally mounted to the container by bracket 92 and pivot pin 94 for movement as illustrated in FIG. 4. The arm 90 is biased by spring 96 toward engagement of the finger 88 with the detent 86. A retainer pin 98 engages retaining bracket 100 to prevent unwanted movement of arm 90. In order to move the adapter 50 from the storage position illustrated in FIGS. 3 and 4 to a position below the coupling member 20, one removes the retainer pin 98 from retaining bracket 100 and pulls on handle 102 of arm 90 thereby disengaging finger 88 from detent 86 and thus permitting the adapter 50 to pivot from the storage position to the position shown in FIGS. 5 and 6.

Once the adapter 50 is freed from the storage position, it may be necessary to push the adapter 50 in the direction A against the biasing force provided by spring 63 while pivoting the adapter into contact with surface 38 of coupling member 20. The edges 66 of shoulders 64 insure proper positioning of the adapter 50 below the coupling member 20. The handle 72 is then moved from the phantom position shown in FIG. 6 where end 76 engages hole 79 to the illustrated position with end 76 engaged in hole 78. This movement of the handle 72 causes a pivoting of shaft 68 and corresponding movement of engaging hook 80 from the phantom position shown in FIG. 5 to the illustrated position. In the illustrated position the top and bottom jaws 104 and 106 of hook 80 clamp the adapter 50 to the coupling member 20 so as to prevent any relative movement from shipping vibration or the like. This action assures that the adapter 50 will not become prematurely disengaged from coupling member 20.

Although the invention has been described in detail with reference to the illustrated preferred embodiment, variations and modifications exist within the scope and spirit of the invention as described and defined in the following claims.

What is claimed is:

1. A wide body container having coupling members for coupling the container to an underlying support, and adapters for use with the container for adapting each of the coupling members to permit the container to be supported upon a set of container supports spaced at a pre-established standard width narrower than the width of the container coupling members, each adapter comprising:
an enclosure, engagement means for engaging the enclosure to the container coupling member when situated therebelow, pivot means for pivotally moving the enclosure from a position below the container coupling member to a position adjacent thereto, and locking means for locking the enclosure below the container adjacent to the container coupling member when the adapter is not in use.

2. The apparatus of claim 1 wherein the enclosure comprises a generally rectangular casting having a plurality of apertures.

3. The apparatus of claim 1 wherein the pivot means comprises a pivot-defining means fixed to the container coupling member, a plurality of brackets fixed to the enclosure, and pin means for engaging the brackets and pivot-defining means to establish an axis about which the adapter can pivot.

4. The apparatus of claim 3 wherein said locking means comprises a detent situated on one of the brackets.

5. The apparatus of claim 4 wherein the locking means further comprises an arm pivotally mounted to the container, the arm including a finger engagable with the detent to secure the enclosure at a position adjacent to the container coupling member.

6. The apparatus of claim 5 wherein the locking means further comprises means biasing the arm and finger into engagement with the detent.

7. The apparatus of claim 5 wherein the locking means further comprises retainer means for retaining the arm and finger in engagement with the detent.

8. The apparatus of claim 2 wherein said engagement means comprises a shoulder protruding from the outer surface of the rectangular casting for engagement within an opening in a container coupling member to position the adapter with respect to the coupling member.

9. The apparatus of claim 1 wherein the engagement means comprises a shaft mounted to pivot within the adapter enclosure and a hook fixed to the shaft for movement between a first position engaging a container coupling member and a second position generally within the adapter.

10. The apparatus of claim 9 wherein one end of the shaft protrudes outside the adapter enclosure, and the engagement means further comprises a bracket fixed to the shaft one end, and interlocking means coupled to the bracket for interlocking the shaft and hook in either of the first and second positions.

11. The apparatus of claim 10 wherein the inerlocking means comprises two interlocking openings in the adapter enclosure, a handle having a first end pivoted to the bracket and a second end adapted to protrude into either of the two interlocking openings, and biasing means biasing the handle second end toward the adapter enclosure.

12. An adapter for adapting a wide-body container having coupling members for coupling the container to an underlying support to permit the container to be supported upon a set of container supports spaced at a pre-established standard width narrower than the width of the container, the adapter comprising:
a generally rectangular enclosure having a plurality of apertures, pivot means for pivotally moving the enclosure from a position below a container coupling member to a position adjacent thereto, locking means for locking the enclosure below the container adjacent to a container coupling member when the adapter is not in use, and engagement means for engaging the enclosure to the container coupling member when situated therebelow including a shaft mounted to pivot within the adapter enclosure and a hook fix to the shaft for movement between a first position engaging a container coupling member and a second position disengaged from the container coupling member and generally within the adapter enclosure.

13. The adapter of claim 12 wherein one end of the shaft protrudes outside the adapter enclosure, and wherein the engagement means further comprises a bracket fixed to the shaft one end, and interlocking means coupled to the bracket for interlocking the shaft and hook in either of the first and second positions.

14. The apparatus of claim 13 wherein the inerlocking means comprises two interlocking openings in the adapter enclosure, a handle having a first end pivoted to the bracket and a second end adapted to protrude into either of the two interlocking openings, and biasing means biasing the handle second end toward the adapter enclosure.

15. The apparatus of claim 14 wherein said engagement means comprises a shoulder protruding from the outer surface of the rectangular enclosure for engagement within an opening in a container coupling member to position the adapter with respect to the coupling member.

16. The apparatus of claim 12 wherein the pivot means comprises a pivot-defining means fixed to the container coupling member, a plurality of brackets fixed to the enclosure, and pin means for engaging the brackets and pivot-defining means to establish an axis about which the adapter can pivot.

17. The apparatus of claim 16 wherein said locking means comprises a detent situated on one of the brackets.

* * * * *